US005667916A

United States Patent [19]
Ebel et al.

[11] Patent Number: 5,667,916
[45] Date of Patent: Sep. 16, 1997

[54] MIXED CATHODE FORMULATION FOR ACHIEVING END-OF-LIFE INDICATION

[75] Inventors: Steven J. Ebel, Clarence Center; Sally Ann Smesko, North Tonawanda; Esther S. Takeuchi, East Amherst, all of N.Y.

[73] Assignee: Wilson Greatbatch Ltd., Clarence, N.Y.

[21] Appl. No.: 644,452

[22] Filed: May 10, 1996

[51] Int. Cl.$^6$ ...................................................... H01M 4/02
[52] U.S. Cl. ........................ 429/218; 429/219; 429/220; 429/221
[58] Field of Search ...................... 429/90, 194, 218, 429/219, 220, 221, 224, 217, 168, 232, 245; 29/623.1, 623.5

[56] References Cited

U.S. PATENT DOCUMENTS

| | | | |
|---|---|---|---|
| 4,136,233 | 1/1979 | Eisenberg | 429/112 |
| 4,164,069 | 8/1979 | Tomczuk | 29/623.1 |
| 4,258,109 | 3/1981 | Liang et al. | 429/191 |
| 4,259,415 | 3/1981 | Tamura et al. | 429/90 |
| 4,304,825 | 12/1981 | Basu | 429/103 |
| 4,481,267 | 11/1984 | Bowden et al. | 429/194 |
| 4,624,902 | 11/1986 | deNeufville et al. | 429/218 |
| 4,668,593 | 5/1987 | Sammells | 429/191 |
| 4,670,363 | 6/1987 | Whitney et al. | 429/196 |
| 4,791,038 | 12/1988 | Shia et al. | 429/218 |
| 5,180,642 | 1/1993 | Weiss et al. | 429/90 |
| 5,273,846 | 12/1993 | Plichta et al. | 429/193 |
| 5,435,874 | 7/1995 | Takeuchi et al. | 156/242 |
| 5,443,930 | 8/1995 | Shoji et al. | 429/224 |
| 5,472,810 | 12/1995 | Takeuchi et al. | 429/218 |

*Primary Examiner*—M. Nuzzolillo
*Attorney, Agent, or Firm*—Hodgson, Russ, Andrews, Woods & Goodyear LLP

[57] ABSTRACT

Battery-powered implantable medical devices require a suitable method for indicating end-of-service of the power source so that there is ample time for elective replacement of the device and/or power source. The present invention utilizes mixed cathode materials preferably comprising a major portion of a fluorinated carbon and a minor portion of a metal-containing material. This mixed cathode formulation is characterized by two, discretely different operating voltages, the second of which may be used as an end-of-life indicator.

37 Claims, 5 Drawing Sheets

1

MIXED CATHODE FORMULATION FOR ACHIEVING END-OF-LIFE INDICATION

BACKGROUND OF THE INVENTION

1. Field of the Invention

The present invention generally relates to the conversion of chemical energy to electrical energy, and more particularly, to an alkali metal electrochemical cell having a positive electrode comprising a cathode active admixture or formulation of a major portion of fluorinated carbon mixed with a minor portion of a metal-containing material. The metal-containing constituent is particularly useful as an end-of-service or end-of-life indicator for the cell.

2. Prior Art

It is known to provide composite cathodes comprising fluorinated carbon for the purpose of providing the cell with an end-of-service indicator. U.S. Pat. No. 5,180,642 to Weiss et al. discloses electrochemical cells having a cathode mixture comprised of manganese dioxide ($MnO_2$), carbon monofluoride ($CF_x$) or mixtures of the two and an end-of-service additive selected from the group consisting of vanadium oxide, silver vanadate, bismuth fluoride and titanium sulfide. U.S. Pat. No. 4,259,415 to Tamura et al. provides a positive active mixture as an end-of-service indicator comprising a main positive active material and a precursor. Suitable main positive active materials include molybdenum oxide ($MoO_3$), silver oxide ($Ag_2O$) and graphite fluoride $(CF)_n$ while suitable precursor materials are oxyacid salts.

What is needed is a power source that is suitable for powering an implantable medical device wherein the battery includes a mixed cathode formulation of at least two active constituents which are characterized by two, discretely different operating voltages, the second of which may be used as an end-of-life indicator. Further, the provision of an end-of-life indicator must not be provided at the expense of safety especially under short circuit conditions. Compromise in this aspect can have fatal consequences.

SUMMARY OF THE INVENTION

The present invention is directed to the use of mixed cathode materials which are characterized by two, discretely different operating voltages, the second of which may be used as an end-of-life or end-of-service indicator. More particularly, the preferred mixed cathode material is a mixture of a major portion of fluorinated carbon and a minor portion of a second cathode active constituent selected from the group of a metal oxide, a mixed metal oxide, a metal halide, a metal sulfide and a metal chalcogenide, and mixture thereof. This mixed cathode material is preferably coupled with a lithium anode and activated with a nonaqueous electrolyte.

One active material which is particularly useful with the present invention is CuS. Copper sulfide mixed with fluorinated carbon provides a characteristic stepped discharge curve which is a useful end-of-service indicator. Also, short circuit testing of this combination cathode system in an alkali metal cell does not result in any increased safety risks. In addition, test results indicate that an alkali metal cell having a $CF_x$/CuS cathode active admixture has higher rate capability than either of the active constituents, which is an unanticipated advantage of this combination cathode system.

These and other aspects of the present invention will become more apparent to those skilled in the art by reference to the following description and to the appended drawings.

DETAILED DESCRIPTION OF THE INVENTION

Figure 1:
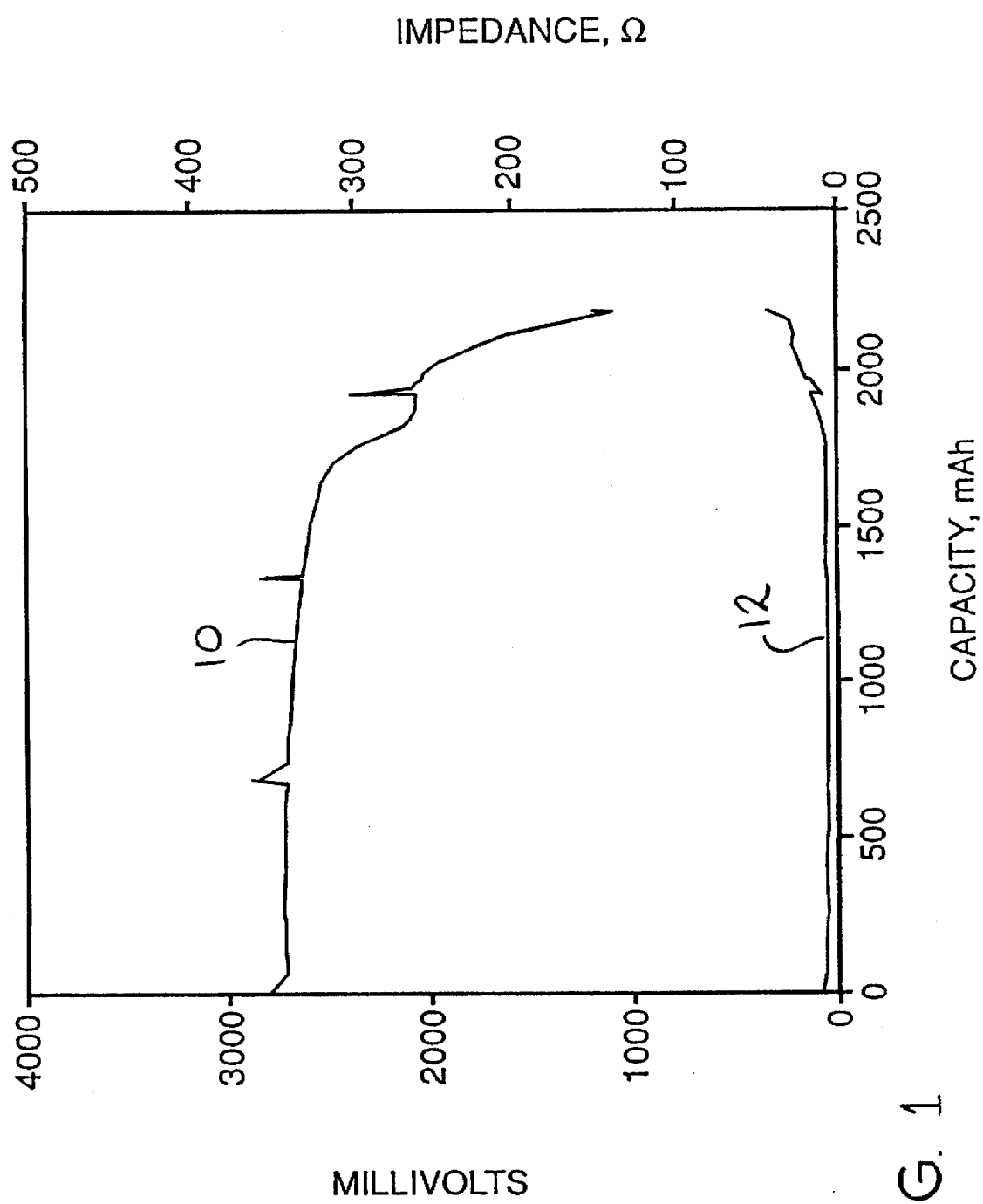
FIG. 1 is a graph constructed from the average discharge of two Li/$CF_x$ cells having a CuS cathode additive and discharged under a 1 kohm load with periodic open circuit storage.

The electrochemical cell of the present invention comprises an anode of a metal selected from Group IA of the Periodic Table of the Elements, including lithium, sodium, potassium, etc., and their alloys and intermetallic compounds including, for example, Li—Si, Li—Al, Li—Mg, Li—Al—Mg, Li—B and Li—Si—B alloys and intermetallic compounds. The form of the anode may vary, but typically, it is made as a thin sheet or foil of the anode metal, and a current collector having an extended tab or lead affixed to the anode sheet or foil.

The electrochemical cell of the present invention further comprises a cathode of electronically conductive composite material which serves as the other electrode of the cell. The electrochemical reaction at the cathode involves conversion of ions which migrate from the anode to the cathode into atomic or molecular forms. The composite cathode material of the present invention comprises at least a first cathode active constituent which preferably is a carbonaceous active material. The carbonaceous material preferably is prepared from carbon and fluorine, and includes graphitic and non-graphitic forms of carbon such as coke, charcoal or activated carbon. The fluorinated carbon is represented by the formula $(CF_x)_n$ wherein x varies between about 0.1 to 1.9 and preferably between about 0.5 and 1.2, and $(C_2F)_n$ wherein the n refers to the number of monomer units which can vary widely. The preferred cathode active mixture comprises $CF_x$ combined with a discharge promoter component such as acetylene black, carbon black and/or graphite. Metallic powders such as nickel, aluminum, titanium and stainless steel in powder form are also useful as conductive diluents when mixed with the cathode active mixture of the present invention. If required, a binder material can also be used. Preferred binders comprise fluoro-resins in powdered form such as powdered polytetrafluoroethylene (PTFE) or powdered polyvinylidene fluoride (PVDF).

Active materials which are suitable as the second active constituent mixed with fluorinated carbon are generally selected from metal oxides, mixed metal oxides, metal sulfides, metal halides and metal chalcogenides. More particularly, the second cathode active constituent is selected from the group consisting of bismuth dioxide ($Bi_2O_3$), bismuth lead oxide ($Bi_2Pb_2O_5$), copper sulfide (CuS), copper chloride (CuCl$_2$), copper oxide (CuO), iron sulfide (FeS), iron disulfide (FeS$_2$), molybdenum oxide (MoO$_3$), nickel sulfide (Ni$_3$S$_2$), silver oxide (Ag$_2$O), silver chloride (AgCl), copper vanadium oxide (CuV$_2$O$_5$), silver vanadium oxide (AgV$_2$O$_{5.5}$), mercury oxide (HgO) and lead dioxide (PbO$_2$) and copper silver vanadium oxide (Cu$_x$Ag$_y$V$_2$O$_z$). The latter active compound is described in U.S. Pat. No. 5,472,810 to Takeuchi et al., which is assigned to the assignee of the present invention and incorporated by reference. In some cases, mixtures of two or more of these active materials can be used as the second active constituent.

What is important is that the second active constituent is selected such that when mixed with the fluorinated carbon and incorporated into the electrochemical cell, should a short circuit occur, the cell will not experience a run-away electrochemical reaction that could eventually result in an explosive condition. Such an occurrence can be fatal, especially when the battery is used to power an implantable medical device.

A preferred cathode active admixture according to the present invention comprises from between about 60% to 85%, by weight, of the first cathode active constituent comprising fluorinated carbon, and from between about 15% to 40%, by weight, of the second cathode active constituent comprising the metal-containing material. A preferred admixture comprises, by weight, about 67% of the fluorinated carbon, about 26% of the second cathode active constituent, about 3% binder material and about 4% conductive diluents.

The blended cathode active admixture may be formed into a free-standing sheet prior to being contacted to a current collector to form the present cathode electrode. One preferred method of preparing a cathode material into a free standing sheet is thoroughly described in U.S. Pat. No. 5,435,874 to Takeuchi et al., which is assigned to the assignee of the present invention and incorporated herein by reference. Further, cathode components for incorporation into a cell according to the present invention may be prepared by rolling, spreading or pressing the cathode active formulations including one or more of the above listed metal-containing cathode active materials mixed with the fluorinated carbon constituent onto a current collector with the aid of a binder material. Suitable current collectors are comprised of a conductive metal including metals such as titanium, nickel, aluminum and stainless steel. Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA anode material by a suitable separator material. The separator is of electrically insulative material and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidine fluoride, tetrafluoroethylene-ethylene copolymer (PETFE), and chlorotrifluoroethylene-ethylene copolymer. Fabrics woven from these fluoropolymeric fibers can be used either alone or laminated with a fluoropolymeric microporous film. Other suitable separator materials include non-woven glass polypropylene, polyethylene, glass fiber materials, ceramics, polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte which serves as a medium for migration of ions between the anode and the cathode electrodes during the electrochemical reactions of the cell. The electrochemical reaction at the electrodes involves conversions of ions in atomic or molecular forms which migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte has an inorganic, ionically conductive salt dissolved in a nonaqueous solvent, and more preferably, the electrolyte includes an ionizable alkali metal salt dissolved in an aprotic organic solvent or a mixture of solvents comprising a low viscosity solvent and a high permittivity solvent. The inorganic, ionically conductive salt serves as the vehicle for migration of the anode ions to intercalate into the cathode active material. Preferably the ion-forming alkali metal salt is similar to the alkali metal comprising the anode.

In a solid cathode/electrolyte system, the ionically conductive salt preferably has the general formula MM'F$_6$ or MM'F$_4$ wherein M is an alkali metal similar to the alkali metal comprising the anode and M' is an element selected from the group consisting of phosphorous, arsenic, antimony and boron. Examples of salts yielding M'F$_6$ are: hexafluorophosphate (PF$_6$), hexafluoroarsenate (AsF$_6$) and hexafluoroantimonate (SbF$_6$), while tetrafluoroborate (BF$_4$) is exemplary of salts yielding M'F$_4$. Alternatively, the corresponding sodium or potassium salts may be used. Thus, for a lithium anode, the alkali metal salt of the electrolyte is selected from LiPF$_6$, LiAsF$_6$, LiSbF$_6$ and LiBF$_4$. Other salts that are useful with a lithium anode include LiClO$_4$, LiAlCl$_4$, LiGaCl$_4$, LiC(SO$_2$CF$_3$)$_3$, LIN(SO$_2$CF$_3$)$_2$ and LiCF$_3$SO$_3$, and mixtures thereof.

Low viscosity solvents include tetrahydrofuran (THF), methyl acetate (MA), diglyme, trigylme, tetragylme, dimethyl carbonate (DMC), 1,2-dimethoxyethane (DE), diethyl carbonate and mixtures thereof, and high permittivity solvents include cyclic carbonates, cyclic esters and cyclic amides such as propylene carbonate (PC), ethylene carbonate (EC), acetonitrile, dimethyl sulfoxide, dimethyl formamide, dimethyl acetamide, γ-butyrolactone (GBL) and N-methyl-pyrrolidinone (NMP) and mixtures thereof. In the present invention, the preferred anode is lithium metal and the preferred electrolyte is 1.0M to 1.4M LiBF$_4$ in γ-butyrolactone (GBL).

The preferred form of the electrochemical cell is a case-negative design wherein the anode/cathode couple is inserted into a conductive metal casing such that the casing is connected to the anode current collector in a case-negative configuration, as is well known to those skilled in the art. A preferred material for the casing is titanium although stainless steel, nickel and aluminum are also suitable. The casing header comprises a metallic lid having a sufficient number of openings to accommodate the glass-to-metal seal/terminal pin feed through for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welded a stainless steel plug over the fill hole, but not limited thereto. The cell of the present invention can also be constructed in a case-positive design.

The following examples describe the manner and process of manufacturing an electrochemical cell according to the present invention, and they set forth the best mode contemplated by the inventors of carrying out the invention, but they are not to be construed as limiting.

EXAMPLE I

Prismatic, 8.6 mm Li/$CF_x$ cells of a central cathode design were used as the test vehicles. In particular, a group of control cells and a group of test cells was constructed to deliver a theoretical capacity of 2.47 Ah, with a 16% lithium excess based on theoretical capacity. Titanium screen served as the cathodic current collector, while the anode comprised lithium foil (0.75±0.01 g) pressed to a nickel screen.

Specifically, a group of test cells was built, designated as Cell Nos. 90360, 90362, 90364 and 90366 in Table 1, each having a cathode comprising a combination of $CF_x$, CuS, PTFE binder and carbon black in the approximate amounts of 67%, 26%, 3%, and 4%, by weight, respectively. The control cells were built having cathodes comprised of $CF_x$, PTFE binder, and carbon black in the approximate amounts of 91%, 4%, and 5%, by weight, respectively. The control cells are designated as Cell Nos. 90367, 90369, 90370 and 90373 in Table 1. The cathodes in both the test cells and the control cells were pressed to a titanium screen and then heat-sealed into a non-woven polypropylene separator envelope. One molar lithium tetrafluoroborate in gamma-butyrolactone served as the electrolyte (3.80±0.15 g).

Both the test cells and the control cells were preconditioned at 37° C. by discharge under a 1.5 kohm load for 18 hours. After a one week open circuit storage period at 37° C., a 20 mA acceptance pulse train, comprised of four pulses, each of a ten second duration immediately followed by a fifteen second rest period, was applied to each cell. The control cells and the test cells were then discharged under either a 1 kohm or a 5.1 kohm load. Closed circuit voltage (CCV) and 1 kHz impedance readings were recorded throughout discharge. AC impedance spectra were also recorded periodically throughout discharge. Specifically, test Cell Nos. 90360 and 90364 were discharged under a 1 kohm load, test Cell Nos. 90362 and 90365 were discharged under a 5.1 kohm load, control Cell Nos. 90369 and 90370 were discharged under a 1 kohm load and control cell Nos. 90367 and 90373 were discharged under a 5.1 kohm load.

It is known that the theoretical open circuit voltage (OCV) of a Li/$CF_x$ cell is approximately 3.3 V. Li/CuS cells discharge initially at 2.15 V as the first reduction of Cu(II) to Cu(I) occurs, and then at 1.85 V for the reduction of Cu(I) to Cu(0). As listed in Table 1, the last CCV recorded during cell conditioning is slightly higher on average for the test cells having the cathodes comprising the major portion of fluorinated carbon admixed with a minor amount of one of the enumerated metal-containing materials useful with the present invention, for example, CuS, than for the control cells devoid of the metal-containing additive. In addition, higher pulse 1 and pulse 4 voltage minima were achieved by the mixed cathode formulation test cells as recorded during the application of the acceptance pulse train. These results indicate that the mixed cathode formulation cells may have higher rate capability, which is an unanticipated advantage of the $CF_x$/CuS combination cathode system.

TABLE 1

| S/N | Cathode material | Additive | Last CCV, mV | Pulse 1 minimum voltage, mV | Pulse 4 minimum voltage, mV |
|---|---|---|---|---|---|
| 90360 | CFx | none | 2738 | 2865 | 2533 |
| 90362 | | | 2741 | 2875 | 2535 |
| 90364 | | | 2743 | 2900 | 2555 |
| 90365 | | | 2747 | 2930 | 2585 |
| avg. | | | 2742 ± 4 | 2893 ± 29 | 2552 ± 24 |
| 90367 | CFx | CuS | 2752 | 2915 | 2638 |
| 90369 | | | 2748 | 2900 | 2633 |
| 90370 | | | 2747 | 2910 | 2630 |
| 90373 | | | 2747 | 2895 | 2605 |
| avg. | | | 2749 ± 2 | 2905 ± 9 | 2627 ± 15 |

Figure 2:
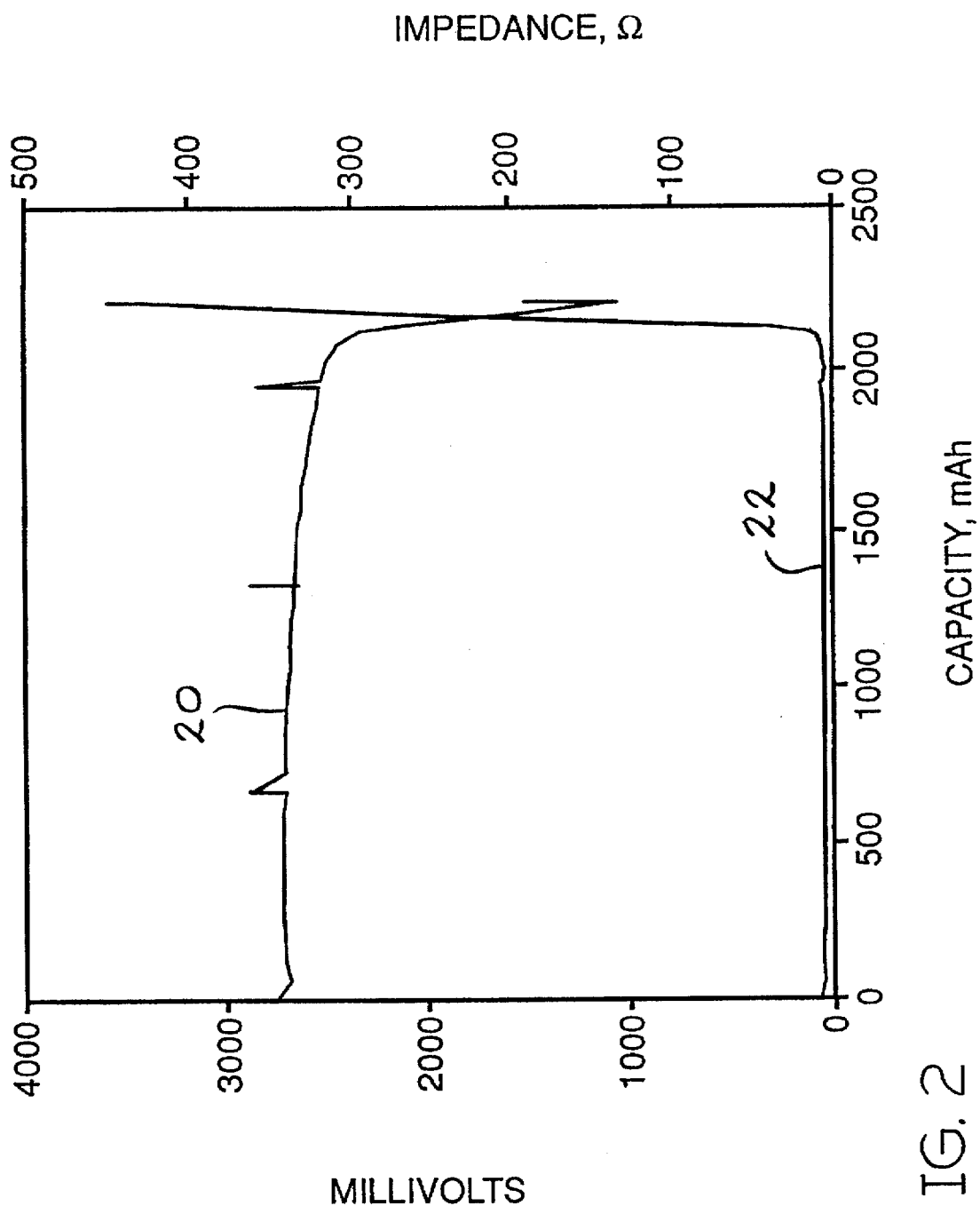
FIG. 2 is a graph constructed from the average discharge of two Li/$CF_x$ cells devoid of a metal-containing additive and discharged under a 1 kohm load with periodic open circuit storage.
Figure 3:
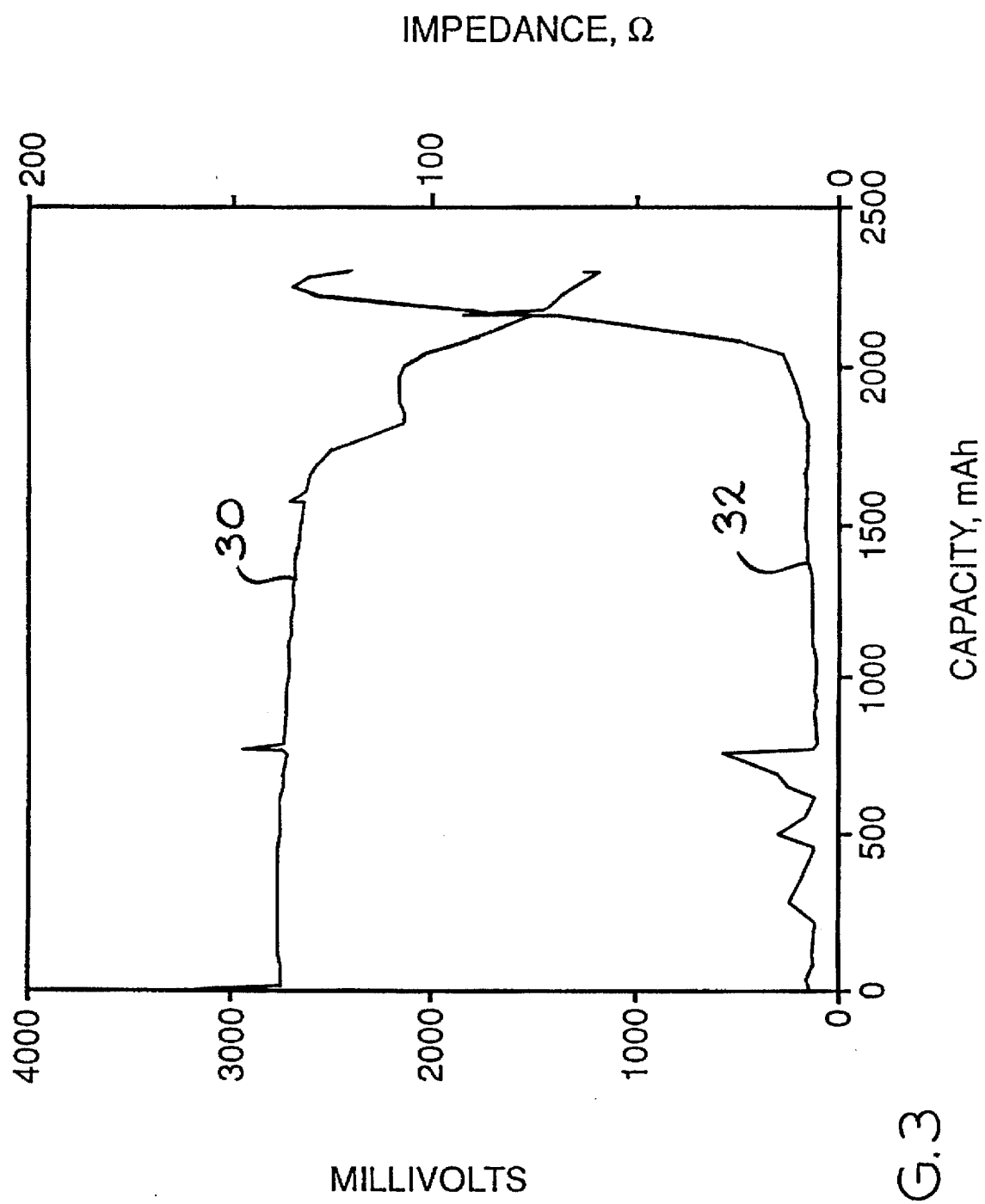
FIG. 3 is a graph constructed from the average discharge of two Li/$CF_x$ cells having a CuS cathode additive and discharged under a 5.1 kohm load with periodic open circuit storage.
Figure 4:
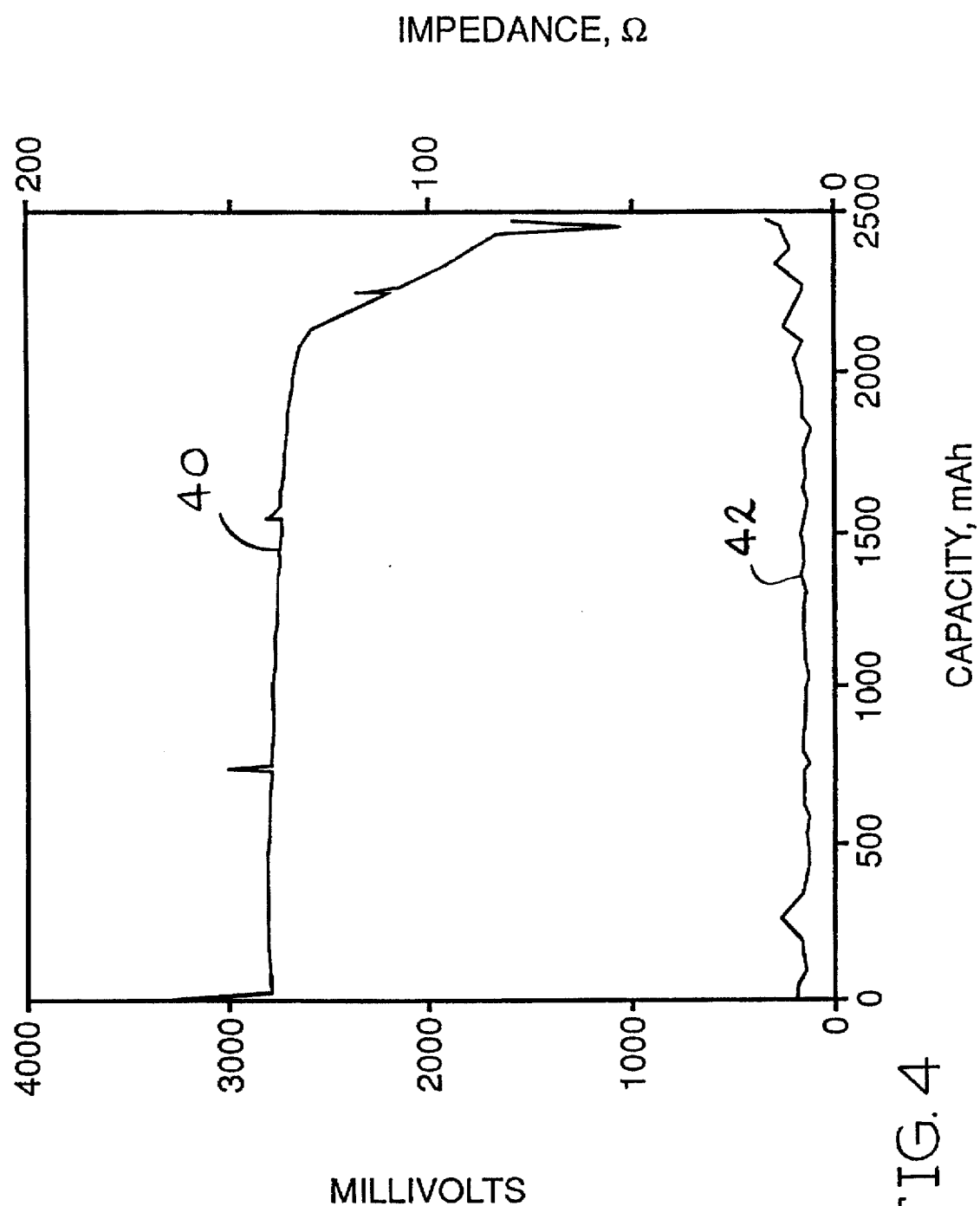
FIG. 4 is a graph constructed from the average discharge of two Li/$CF_x$ cells devoid of a metal-containing additive and discharged under a 5.1 kohm load with periodic open circuit storage.

FIGS. 1 to 4 show the average discharge profiles of the control and test cells used in this example, discharged under either a 1 kohm or a 5.1 kohm load. In FIG. 1, curve 10 was constructed from the average discharge of the first group of cells having the $CF_x$ cathode including the CuS additive and discharged under a 1 kohm load, and curve 12 was constructed from the average impedance of this group of cells. In FIG. 2, curve 20 was constructed from the average discharge of the second group of cells having the $CF_x$ cathode devoid of a metal-containing additive and discharged under a 1 kohm load, and curve 22 was constructed from the average impedance of this group of cells. In FIG. 3, curve 30 was constructed from the average discharge of the third group of cells having the $CF_x$ cathode including the CuS additive and discharged under a 5.1 kohm load, and curve 32 was constructed from the average impedance of the cell group. Finally, in FIG. 4, curve 40 was constructed from the average impedance of the fourth group of cells having the $CF_x$ cathode devoid of a metal-containing additive and discharged under a 5.1 kohm load.

The discharge profiles of the cells with the CuS additive clearly show a second plateau occurring at about 1.8 V and also exhibit a greater rise in impedance than the control cells under each discharge load. The characteristics of a second voltage plateau and an increased impedance rise can each be used to signal end-of-service or end-of-life of the discharged cell.

Furthermore the use of CuS as an end-of-life cathode additive does not result in any increased safety risks, as the short circuit temperature of the cell remains less than 50° C. The peak temperature of 48° C. for a lithium anode, $CF_x$/CuS test cell built according to this example was reached 17 minutes and 24 seconds after application of the short, while the peak temperature of 43° C. for a Li/$CF_x$ control cell was reached 29 minutes after application of the short. A peak current of 0.28 A was reached by the test cell with the combination cathode, while a peak current of 0.13 A was attained by the control cells under the short circuit test. After the short circuit testing was completed, there was no physical change noted in the condition of either the test or control cells. In addition, there was no change in the OCV of either the test or control cells as a result of shock testing. (Shock testing procedure: 10 shocks applied for 0.5 milliseconds in each of 3 mutually perpendicular test axes for a total of 30 shocks. Cell OCV is measured and recorded prior to and after each axis is tested. The cells were visually examined after shock testing.)

Figure 5:
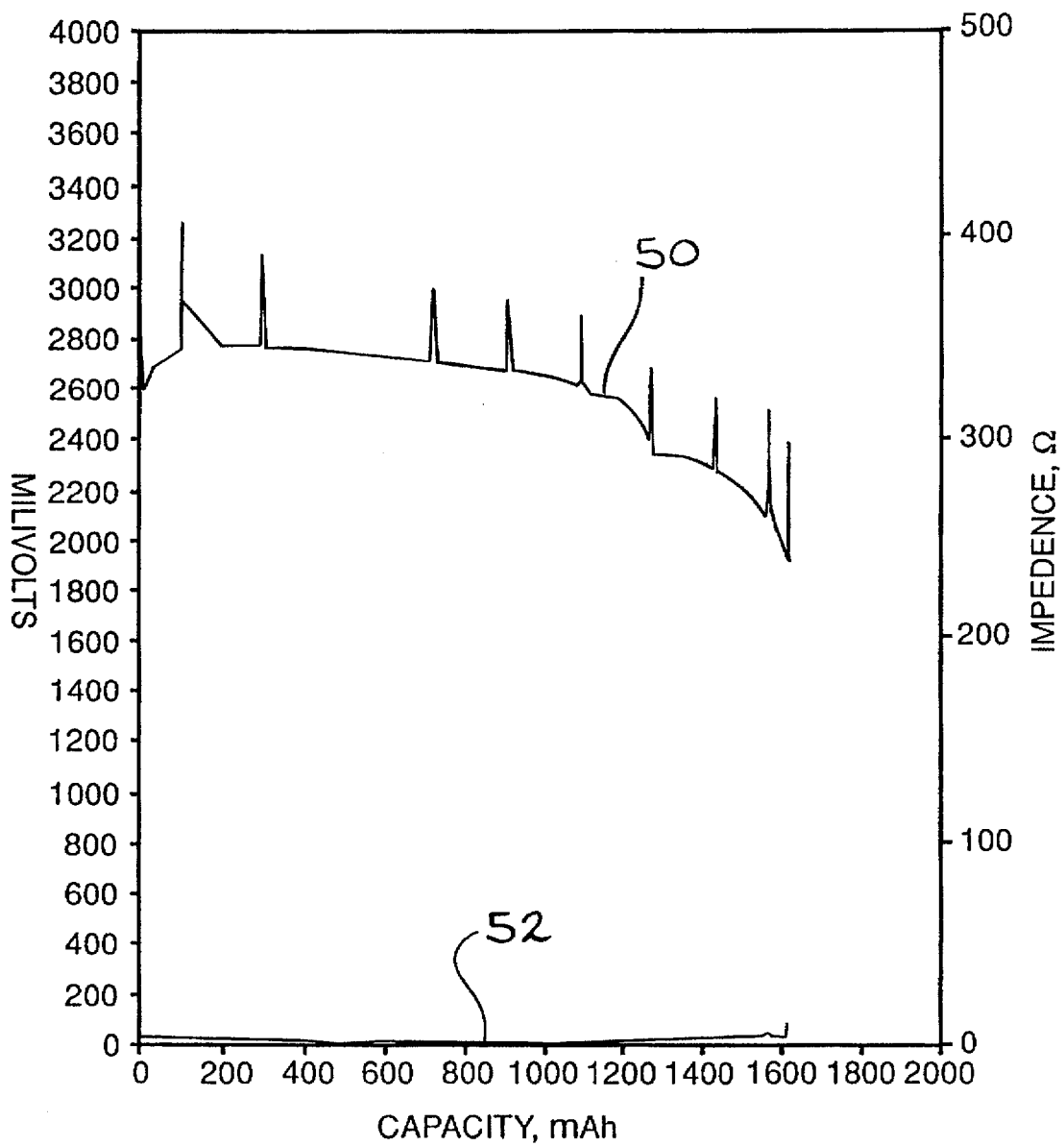
FIG. 5 is a graph constructed from the discharge of a Li/$CF_x$ cell having a $Ag_2O$ cathode additive and discharged under a 2 kohm load with periodic open circuit storage.

EXAMPLE II $Ag_2O$ was also tested and found to function as an effective end-of-service indicator for the Li/$CF_x$ system. A cathode comprised of 2.0 grams of $CF_x$ mixed with 2.4 grams of $Ag_2O$ was used in combination with a lithium anode and activated with an organic electrolyte comprising 1M $LiB_4$ dissolved in propylene carbonate. This cell was preconditioned under a 1.5 kohm load, stored for one week and then pulse discharged under a similar protocol as that used to discharge the test cells and the control cells in Example I. Following pulse discharge, this cell was discharged under a 2 kohm load with closed circuit voltage and 1 kHz impedance readings recorded throughout discharge. During discharge, this cell showed an initial potential of 2.7 V under the 2 kohm load before the discharge potential decreased to approximately 2.3 V prior to end-of-life, as indicated by curve 50 in FIG. 5. Curve 52 was constructed from the impedance of this cell.

It is appreciated that various modifications to the inventive concepts described herein may be apparent to those skilled in the art without departing from the spirit and the scope of the present invention defined by the hereinafter appended claims.

What is claimed is:

1. An electrochemical cell, which comprises:
   (a) an anode;
   (b) a cathode operatively associated with the anode, wherein the cathode includes a cathode active mixture comprising:
      i) fluorinated carbon as a major portion of the cathode active mixture; and
      ii) a second cathode active constituent as a minor portion of the cathode active mixture, wherein the second cathode active constituent is selected from the group consisting of bismuth dioxide ($Bi_2O_3$), bismuth lead oxide ($Bi_2Pb_2O_5$), copper sulfide (Cus), copper chloride ($CuCl_2$), copper oxide (CuO), iron sulfide (FeS), iron disulfide ($FeS_2$), molybdenum oxide ($MoO_3$), nickel sulfide ($Ni_3S_2$), silver oxide ($Ag_2O$), silver chloride (AgCl), copper vanadium oxide ($CuV_2O_5$), copper silver vanadium oxide ($Cu_xAg_yV_2O_z$) and mercury oxide (HgO), and mixtures thereof; and
   (c) an electrolyte solution activating the anode and the cathode, wherein the fluorinated carbon provides the electrochemical cell dischargeable at a first voltage plateau and the second cathode active constituent provides the cell dischargeable at a second voltage plateau, less than the first voltage plateau, as an end-of-life indicator for the cell.

2. The electrochemical cell of claim 1 wherein the fluorinated carbon is present in the cathode active mixture in the first percentage ranging between about 60% to about 85%, by weight, and the second cathode active constituent is present in the second percentage ranging between about 15% to about 40%, by weight.

3. The electrochemical cell of claim 1 wherein the fluorinated carbon is present in a first percentage of about 67%, by weight, and the second cathode active constituent is present in a second percentage of about 26%, by weight, remainder being at least one of a binder material and a conductive additive.

4. The electrochemical cell of claim 3 wherein the binder material is a fluoro-resin powder.

5. The electrochemical cell of claim 3 wherein the conductive additive is selected from the group consisting of carbon, graphite powder and acetylene black and metallic powder selected from the group consisting of titanium, aluminum, nickel and stainless steel, and mixtures thereof.

6. The electrochemical cell of claim 1 wherein the anode comprises an alkali metal.

7. The electrochemical cell of claim 6 wherein the alkali metal is lithium.

8. The electrochemical cell of claim 1 wherein the cathode further includes a current collector comprised of titanium.

9. The electrochemical cell of claim 1 wherein the anode contacts the casing in a case-negative configuration.

10. The electrochemical cell of claim 1 wherein the electrolyte solution operatively associated with the anode and the cathode comprises an ion-forming alkali metal salt dissolved in a nonaqueous solvent, wherein the alkali metal of the salt is the same as the alkali metal comprising the anode.

11. The electrochemical cell of claim 10 wherein the alkali metal of the anode comprises lithium and the ion-forming alkali metal salt comprising the electrolyte solution is selected from the group consisting of $LiPF_6$, $LiAsF_6$, $LiSbF_6$, $LiB_4$, $LiClO_4$, $LiAlCl_4$, $LiGaCl_4$, $LiC(SO_2CF_3)_3$, $LiN(SO_2CF_3)$ and $LiCF_3SO_3$, and mixtures thereof.

12. The electrochemical cell of claim 11 wherein the nonaqueous solvent comprises an organic solvent selected from the group consisting of tetrahydrofuran, methyl acetate, diglyme, triglyme, tetraglyme, dimethyl carbonate, 1,2-dimethoxyethane, diethyl carbonate, acetonitrile, dimethyl sulfoxide, dimethyl formamide, dimethyl acetamide, propylene carbonate, ethylene carbonate, γ-butyrolactone and N-methyl-pyrrolidinone, and mixtures thereof.

13. A cathode means comprising a cathode active mixture, wherein the cathode means comprises:
   (a) a cathode current collector;
   (b) fluorinated carbon present in a first range of about 60% to about 85%, by weight, of the cathode active mixture; and
   (c) a second cathode active constituent mixed with the fluorinated carbon in a second range of about 15% to about 40%, by weight, of the cathode active mixture, wherein the second cathode active constituent is selected from the group consisting of bismuth dioxide ($Bi_2O_3$), bismuth lead oxide ($Bi_2Pb_2O_5$), copper sulfide (CuS), copper chloride ($CuCl_2$), copper oxide (CuO), iron sulfide (FeS), iron disulfide ($FeS_2$), molybdenum oxide ($MOO_3$), nickel sulfide ($Ni_3S_2$), silver oxide ($Ag_2O$), silver chloride (AgCl), copper vanadium oxide ($CuV_2O_5$), copper silver vanadium oxide ($Cu_xAg_yV_2O_z$) and mercury oxide (HgO), and mixtures thereof, and wherein the cathode active mixture is contacted to the cathode current collector.

14. The cathode means of claim 13 wherein the fluorinated carbon is present in a first percentage of about 67%, by weight, and the second cathode active constituent is present in a second percentage of about 26%, by weight, remainder being at least one of a binder material and a conductive additive.

15. The cathode means of claim 14 wherein the binder material is a fluoro-resin powder.

16. The cathode means of claim 14 wherein the conductive additive is selected from the group consisting of carbon, graphite powder and acetylene black and metallic powder selected from the group consisting of titanium, aluminum, nickel and stainless steel, and mixtures thereof.

17. The cathode means of claim 13 wherein the cathode current collectors is comprised of titanium.

18. An electrochemical cell, which comprises:
   (a) an alkali metal anode;
   (b) a cathode operatively associated with the anode, wherein the cathode includes a cathode active mixture comprising:

(i) fluorinated carbon as a major portion of the cathode active mixture; and (ii) copper sulfide as a minor portion of the cathode active mixture; and (c) an electrolyte solution activating the anode and the cathode, wherein the fluorinated carbon provides the electrochemical cell dischargeable at a first voltage plateau and the copper sulfide provides the cell dischargeable at a second voltage plateau, less than the first voltage plateau, as an end-of-life indicator for the cell.

19. The electrochemical cell of claim 18 wherein the fluorinated carbon is present in the cathode active mixture in the first percentage ranging between about 60% to about 85%, by weight, and the copper sulfide is present in the second percentage ranging between about 15% to about 40%, by weight.

20. The electrochemical cell of claim 19 herein the alkali metal of the anode comprises lithium and wherein the electrolyte comprises an ion-forming alkali metal salt dissolved in a nonaqueous solvent, the ion-forming alkali metal salt being selected from the group consisting of $LiPF_6$, $LiAsF_6$, $LiBF_4$, $LiClO_4$, $LiAlCl_4$, $LiGaCl_4$, $LiC(SO_2CF_3)_3$, $LiN(SO_2CF_3)$ and $LiCF_3SO_3$, and mixtures thereof.

21. A cathode means comprising a cathode active mixture, wherein the cathode means comprises:

(a) a cathode current collector;

(b) fluorinated carbon present in a first range of about 60% to about 85%, by weight, of the cathode active mixture; and (c) copper sulfide present in a second range of about 15% to about 40%, by weight, of the cathode active mixture, wherein the cathode active mixture is contacted to the cathode current collector.

22. A method of providing an electrochemical cell, comprising the steps of:

a) providing a casing;

b) providing an anode;

c) providing a cathode current collector;

d) preparing a cathode active mixture by mixing fluorinated carbon as a major portion of the cathode active mixture with a second cathode active constituent as a minor portion of the cathode active mixture, wherein the second cathode active constituent is selected from the group consisting of bismuth dioxide ($Bi_2O_3$), bismuth lead oxide ($Bi_2Pb_2O_5$), copper sulfide (CuS), copper chloride ($CuCl_2$), copper oxide (CuO), iron sulfide (FeS), iron disulfide ($FeS_2$), molybdenum oxide ($MoO_3$), nickel sulfide ($Ni_3S_2$), silver oxide ($Ag_2O$), silver chloride (AgCl), copper vanadium oxide ($CuV_2O_5$), copper silver vanadium oxide ($Cu_xAg_yV_2O_z$) and mercury oxide (HgO), and mixtures thereof;

e) contacting the cathode current collector with the cathode active mixture;

f) operatively associating the anode with the cathode housed inside the casing with the anode and the cathode connected to respective terminals; and g) activating the anode and the cathode with an electrolyte filled into the casing, wherein the fluorinated carbon provides the electrochemical cell dischargeable at a first voltage plateau and the second cathode active constituent provides the cell dischargeable at a second voltage plateau, less than the first voltage plateau, as an end-of-life indicator for the cell.

23. The method of claim 22 including providing the fluorinated carbon present in the cathode active mixture in the first percentage ranging from between about 60% to about 85%, by weight, and further providing the second cathode active constituent present in the cathode active mixture in the second percentage ranging between about 40% to about 15%, by weight.

24. The method of claim 22 including providing the fluorinated carbon present in the cathode active mixture in a first percentage of about 67%, by weight, and the second cathode active constituent present in the cathode active mixture in a second percentage of about 26%, by weight, remainder being at least one of a binder material and a conductive additive.

25. The method of claim 22 including providing the anode comprised of an alkali metal.

26. The method of claim 22 including providing the casing comprised of titanium.

27. The method of claim 22 including providing the cathode current collector comprised of titanium.

28. The method of claim 22 including providing the electrolyte solution operatively associated with the anode and the cathode comprising an ion-forming alkali metal salt dissolved in a nonaqueous solvent, wherein the alkali metal of the salt is the same as an alkali metal comprising the anode.

29. The method of claim 28 including providing the anode comprised of lithium and selecting the ion-forming alkali metal salt comprising the electrolyte solution from the group consisting of $LiPF_6$, $LiAsF_6$, $LiSbF_6$, $LiBF_4$, $LiClO_4$, $LiAlCl_4$, $LiGaCl_4$, $LiC(SO_2CF_3)_3$, $LiN(SO_2CF_3)$ and $LiCF_3SO_3$, and mixtures thereof.

30. The method of claim 28 including providing the nonaqueous solvent comprising an organic solvent selected from the group consisting of tetrahydrofuran, methyl acetate, diglyme, triglyme, tetraglyme, dimethyl carbonate, 1,2-dimethoxyethane, diethyl carbonate, acetonitrile, dimethyl sulfoxide, dimethyl formamide, dimethyl acetamide, propylene carbonate, ethylene carbonate, γ-butyrolactone and N-methyl-pyrrolidinone, and mixtures thereof.

31. A method of providing a cathode, comprising the steps of:

a) providing a current collector;

b) preparing a cathode active mixture by mixing fluorinated carbon present in a first range of about 60% to about 85%, by weight, of the cathode active mixture with a second cathode active constituent present in a second range of about 15% to about 40%, by weight, of the cathode active mixture, wherein the second cathode active constituent is selected from the group consisting of bismuth dioxide ($Bi_2O_3$), bismuth lead oxide ($Bi_2Pb_2O_5$), copper sulfide (CuS), copper chloride ($CuCl_2$), copper oxide (CuO), iron sulfide (FeS), iron disulfide ($FeS_2$), molybdenum oxide ($MoO_3$), nickel sulfide ($Ni_3S_2$), silver oxide ($Ag_2O$), silver chloride (AgCl), copper vanadium oxide ($CuV_2O_5$), copper silver vanadium oxide ($Cu_xAg_yV_2O_z$) and mercury oxide (HgO), and mixtures thereof; and c) contacting the cathode current collector with the cathode active mixture.

32. The method of claim 31 including providing the fluorinated carbon present in the cathode active mixture in a first percentage of about 67%, by weight, and the second cathode active constituent present in the cathode active mixture in a second percentage of about 26%, by weight, remainder selected from at least one of a binder material and a conductive additive.

33. The method of claim 31 including providing the cathode current collector comprised of titanium.

34. A method of providing an electrochemical cell, comprising the steps of:
   a) providing a casing;
   b) providing an alkali metal anode;
   c) providing a cathode current collector;
   d) preparing a cathode active mixture by mixing fluorinated carbon as a major portion of the cathode active mixture with copper sulfide as a minor portion of the cathode active mixture;
   e) contacting the cathode current collector with the cathode active mixture;
   f) operatively associating the anode with the cathode housed inside the casing with the anode and the cathode connected to respective terminals; and
   g) activating the anode and the cathode with an electrolyte filled into the casing, wherein the fluorinated carbon provides the electrochemical cell dischargeable at a first voltage plateau and the copper sulfide provides the cell dischargeable at a second voltage plateau, less than the first voltage plateau, as an end-of-life indicator for the cell.

35. The method of claim 34 including providing the fluorinated carbon present in the cathode active mixture in the first percentage ranging from between about 60% to about 85%, by weight, and further providing the copper sulfide present in the cathode active mixture in the second percentage ranging between about 40% to about 15%, by weight.

36. The method of claim 34 including providing the anode comprised of lithium and further including providing the electrolyte comprising an ion-forming alkali metal salt dissolved in a nonaqueous solvent, and selecting the ion-forming alkali metal salt from the group consisting of $LiPF_6$, $LiAsF_6$, $LiSbF_6$, $LiBF_4$, $LiClO_4$, $LiAlCl_4$, $LiGaCl_4$, $LiC(SO_2CF_3)_3$, $LiN(SO_2CF_3)$ and $LiCF_3SO_3$, and mixtures thereof.

37. A method of providing a cathode, comprising the steps of:
   a) providing a current collector;
   b) preparing a cathode active mixture by mixing fluorinated carbon present in a first range of about 60% to about 85%, by weight, of the cathode active mixture with copper sulfide present in a second range of about 15%, to about 40%, by weight of the cathode active mixture; and
   c) contacting the cathode current collector with the cathode active mixture.

* * * * *